United States Patent

Reder et al.

[11] Patent Number: 5,838,385
[45] Date of Patent: Nov. 17, 1998

[54] SAMPLING ANALOG VIDEO SIGNAL FOR SECONDARY IMAGES

[75] Inventors: John R. Reder; Donald B. Doherty, both of Richardson, Tex.

[73] Assignee: Texas Instruments Incorporated, Dallas, Tex.

[21] Appl. No.: 706,367

[22] Filed: Aug. 30, 1996

[51] Int. Cl.$^6$ .................................................. H04N 5/45
[52] U.S. Cl. ...................... 348/565; 348/566; 348/568; 348/588; 348/448
[58] Field of Search ...................... 348/568, 588, 348/566, 565, 567, 564, 561, 562, 596, 448; H04N 5/445, 5/45

[56] References Cited

U.S. PATENT DOCUMENTS

| | | |
|---|---|---|
| 4,665,439 | 5/1987 | Naimpally . |
| 4,750,039 | 6/1988 | Willis ........................................ 348/448 |
| 4,782,391 | 11/1988 | McNeely et al. . |
| 4,956,619 | 9/1990 | Hornbeck ................................. 348/771 |
| 5,079,544 | 1/1992 | DeMond . |
| 5,111,297 | 5/1992 | Tsuji ........................................ 348/448 |
| 5,233,385 | 8/1993 | Sampsell ................................. 348/270 |
| 5,278,652 | 1/1994 | Urbanus ................................... 348/571 |
| 5,422,677 | 6/1995 | Do . |
| 5,452,024 | 9/1995 | Sampsell ................................. 348/770 |
| 5,459,528 | 10/1995 | Pettitt . |
| 5,526,051 | 6/1996 | Gove ....................................... 348/721 |

FOREIGN PATENT DOCUMENTS 25 42 502  7/1977  Germany .
WO 91/19348  12/1991  WIPO .

Primary Examiner—Sherrie Hsia
Attorney, Agent, or Firm—Julie L. Reed; Charles A. Brill; Richard L. Donaldson

[57] ABSTRACT

A data converter (13) for providing data for secondary images in a video display system (10). One embodiment (FIG. 2) provides data for a staggered pixel array, by using an A/D converter (23) to sample the data at a rate of $2/n(h)$ times the sample rate of the main image, where $1/n(h)$ is the horizontal scaling factor. A multiplexer (24) selects between two different sample patterns. Another embodiment (FIG. 3) provides data for progressively scanned secondary images by selecting $2/n(v)$ times the number of lines per input field, where $1/n(v)$ is the vertical scaling factor.

19 Claims, 3 Drawing Sheets

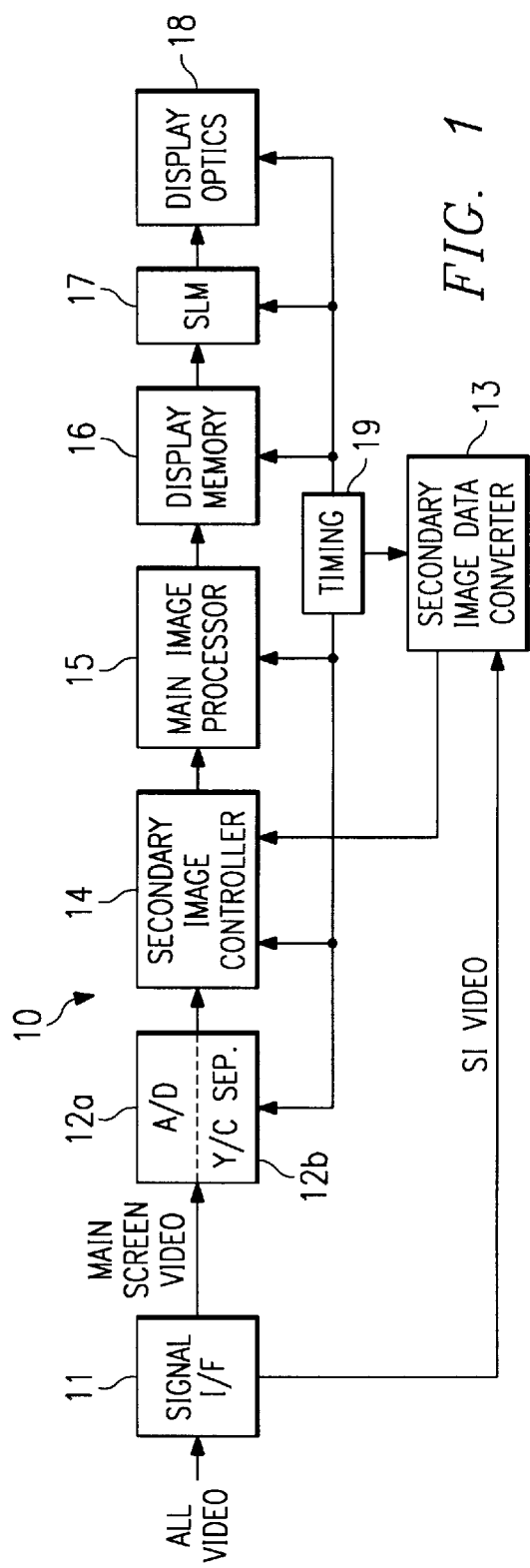
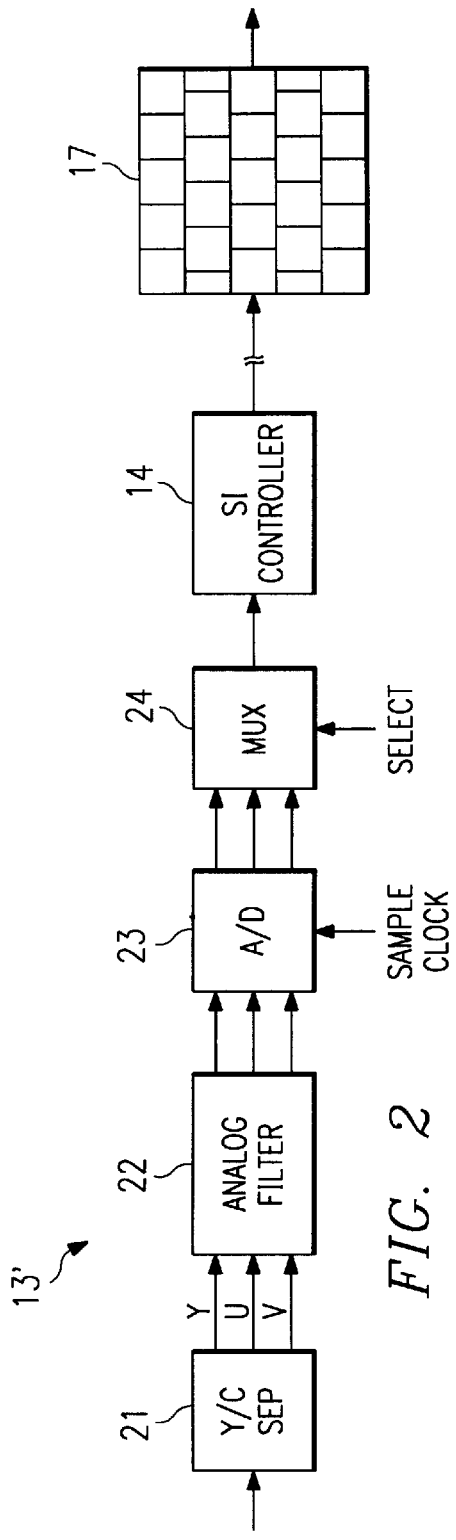

FIG. 2A
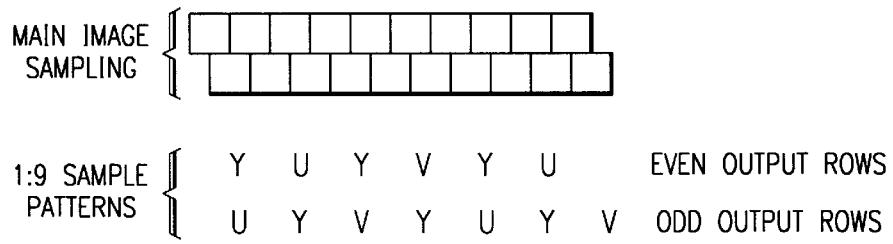
|  | | | | | | | |
|---|---|---|---|---|---|---|---|
| 1:9 SAMPLE PATTERNS | Y | U | Y | V | Y | U |  | EVEN OUTPUT ROWS |
|  | U | Y | V | Y | U | Y | V | ODD OUTPUT ROWS |
FIG. 2B
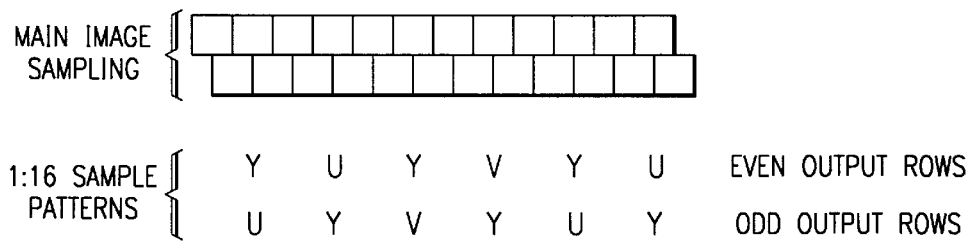
|  | | | | | | |
|---|---|---|---|---|---|---|
| 1:16 SAMPLE PATTERNS | Y | U | Y | V | Y | U | EVEN OUTPUT ROWS |
|  | U | Y | V | Y | U | Y | ODD OUTPUT ROWS |
FIG. 2C
| SAMPLE PATTERN | FIELD INPUT LINES | 1:9 OUTPUT LINES (INTERLACED) |
|---|---|---|
| EVEN | 0 → 0 | |
| | ✗ | |
| | ✗ | |
| EVEN | 6 → 2 | |
| | ✗ | |
| | ✗ | |
| EVEN | 12 → 4 | |
FIG. 2D
| SAMPLE PATTERN | FIELD INPUT LINES | 1:9 OUTPUT LINES (PROSCAN) |
|---|---|---|
| EVEN | 0 → 0 | |
| ODD | 2 → 1 | |
| | ✗ | |
| EVEN | 6 → 2 | |
| ODD | 8 → 3 | |
| | ✗ | |
| EVEN | 12 → 4 | |
FIG. 4A
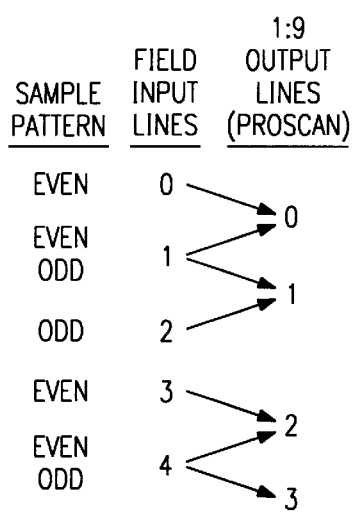

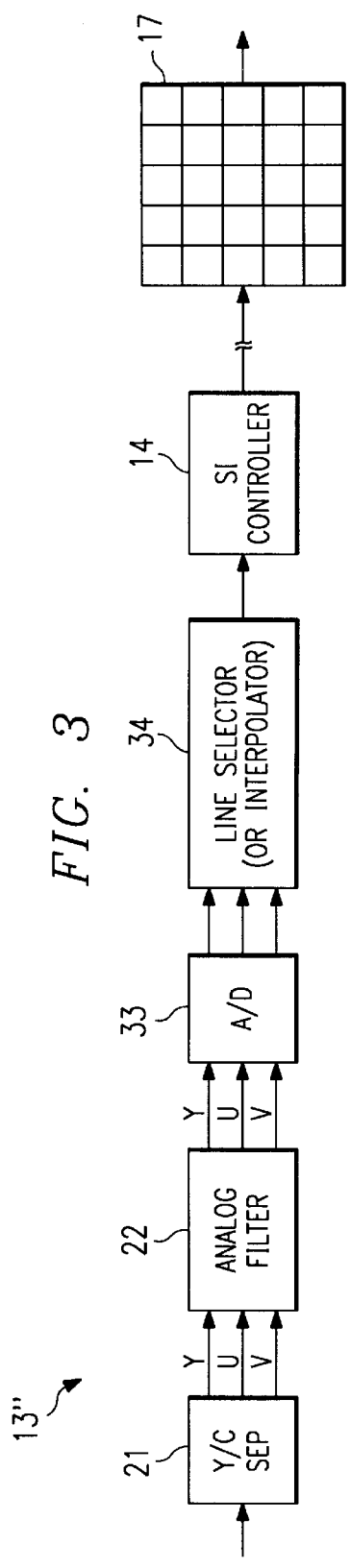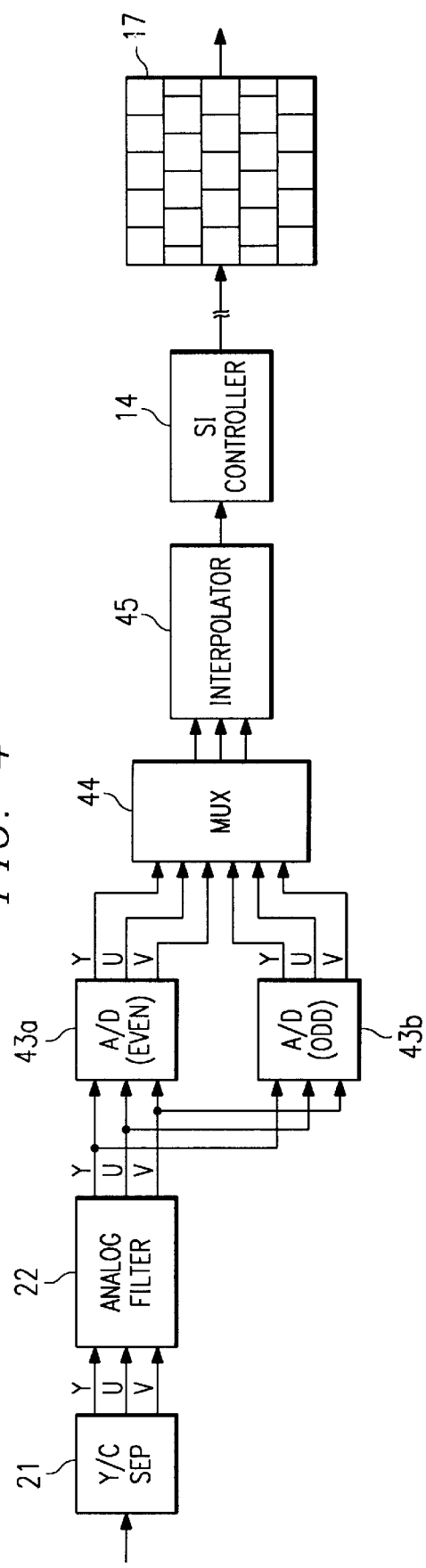

SAMPLING ANALOG VIDEO SIGNAL FOR SECONDARY IMAGES

TECHNICAL FIELD OF THE INVENTION

This invention relates to video display systems, and more particularly to providing a secondary image, such as a picture-in-picture, with a main display screen of a digital display system.

BACKGROUND OF THE INVENTION

A feature of many video display systems is the ability to display a picture-in-picture (PIP), which is a small frame within the main image frame, usually of a scaled down image from a different signal. Other types of secondary images are also possible. For example, some display screens are sized for an image having a 16:9 aspect ratio. However, if such a screen is used to display an image with a 4:3 aspect ratio, the remaining area on the side could be used to display a "stack" of small images. This latter feature is sometimes referred to as a picture-outside-picture (POP) display.

For displaying these secondary images, a signal that would otherwise be displayed as the main image is scaled down to a smaller size. Typical ratios of the size of the secondary image to the size of the main image are 1:9 and 1:16. For 1:9 scaling, the vertical size and horizontal size are each reduced to ⅓ of the main image size. Likewise, for 1:16 scaling, the vertical and horizontal sizes are each reduced to ¼ of the main image size.

U.S. Pat. Ser. No. 08/221,725, U.S. Pat. No. 5,459,528, entitled "Video Signal Processing for Secondary Images," assigned to Texas Instruments Incorporated, describes methods of providing data for secondary images. It describes various techniques for both horizontal and vertical scaling, that permit the same processor to be selectable for different scaling factors.

SUMMARY OF THE INVENTION

One aspect of the invention is a method of providing pixel data for a secondary image within or adjacent to a main image. The main image has a main image sample rate, which is substantially determined by the number of pixels per line, the number of lines per second. The images are displayed on a display device having a staggered pixel array. First, an analog color difference signal is separated into a luminance component and at least one chrominance component. Each of these components are sampled at a rate of 2/n(h) times the main image sample rate, where 1/n(h) is the horizontal scaling factor of the secondary image. The result of the sampling is a stream of luminance samples and at least one stream of chrominance samples. From these streams of samples, a first pattern of samples for even rows of the staggered pixel array is selected. Every other sample of the first pattern is a luminance sample and every other sample is a chrominance sample. A second pattern of samples for odd rows of the staggered pixel array is selected. Every other sample of the second sample is a luminance sample and every other sample is a chrominance sample, but the luminance samples of the first pattern and of the second pattern are offset by one sample.

Another aspect of the invention provides pixel data for progressively scanned secondary images. A third aspect of the invention is especially designed to provide pixel data for progressively scanned secondary images to be displayed on a staggered pixel array.

A technical advantage of the invention is that it provides better secondary image displays. For display systems having staggered pixel arrays, the scaling process aligns the data with the pixels. For progressive scan displays, the scaling process provides the correct number of lines without the need for an additional interpolation or other line-generating step. Various embodiments of the invention do not require the secondary image data converter to have a programmed processor, and may be implemented with less expensive logic devices.

BRIEF DESCRIPTION OF THE DRAWINGS

FIG. 1 is a block diagram of a display system having a secondary image data converter in accordance with the invention.

FIG. 2 is a block diagram of one embodiment of the secondary image data converter of FIG. 1, with a display device having a staggered pixel array.

FIGS. 2A and 2B illustrate the even-line and odd-line patterns selected by the multiplexer of FIG. 2.

FIGS. 2C and 2D illustrate 1:9 line selection by the multiplexer of FIG. 2 for non-proscan and proscan data, respectively.

FIG. 3 is a block diagram of another embodiment of the secondary image data converter of FIG. 1, used for progressive scan displays.

FIG. 4 is a block diagram of another embodiment of the secondary image data converter of FIG. 1, used for progressive scan displays on a display device having a staggered pixel array.

FIG. 4A illustrates an interpolation scheme implemented by the secondary image data converter of FIG. 4.

DETAILED DESCRIPTION OF THE INVENTION

The following description is in terms of a video display system that uses a spatial light modulator (SLM) rather than a cathode ray tube (CRT) to generate images. However, the various aspects of the invention could also be used with for other pixel array display devices, such as an LCD, which have individually addressed pixels rather than a scanned display. The progressive scan aspects of the invention could further be used with a CRT display system, or other display system that processes video data digitally before converting it back to an analog signal for display.

FIG. 1 is a block diagram of a display system 10, which receives an analog video signal, such as a broadcast television signal. In the example of this description, an NTSC signal, which is interlaced in even-row and odd-row fields, is assumed. It is also assumed that the input signal has a luminance component and color difference components. For purposes of example, the signal is a YUV signal, but the invention is useful with other color difference signals, such as a Y, B-Y, and R-Y signal. Only those components of display system 10 that are significant to main-screen and secondary-screen data processing are shown. Other components, such as might be used for processing synchronization and audio signals or for features such as closed captioning, are not shown.

As an overview of the operation of display system 10, signal interface 11 receives an analog video signal and separates video, synchronization, and audio signals. For secondary image displays, signal interface 11 obtains the signal for the main image and for the secondary image. Although for purposes of example, the rest of this description is in terms of PIP images, the same concepts apply to picture-outside-picture (POP) images, which are located beside the main picture rather than overlaid on top of it, or for any other secondary picture which is derived from a video signal and displayed with a reduced size.

Signal interface 11 delivers the video signal for the main image to A/D converter 12a and Y/C separator 12b, which convert the data into pixel-data samples and which separate the luminance ("Y") data from the chrominance ("C") data, respectively. Y/C separator 12b also divides the chrominance data into its various components, such as U and V in this example. In FIG. 1, the signal is converted to digital data before Y/C separation, but in other embodiments, Y/C separation could be performed before A/D conversion.

Signal interface 11 delivers the video signal for the secondary image to secondary image data converter 13. This signal may come from a second tuner for a television signal or from an input from another device such as a video camera/recorder (VCR). As explained below in connection with FIGS. 2–4, secondary image data converter 13 scales the data to the desired number of rows and pixels per row. It then delivers the secondary image data to a control unit 14, which inserts the secondary image data into the proper location with respect to the main image data. As explained below, various embodiments of the invention provide secondary image data as pixel data that may or may not need further processing before delivery to display memory 16. Typically, all data for the final image undergoes color conversion and linearization in the same process, although the main image data and the secondary image data could undergo this processing separately.

Processor system 15 prepares the data for display, by performing various pixel data processing tasks. Processor system 15 may include various memory devices for storing pixel data during processing, such as field and line buffers. The tasks performed by processor system 15 may include linearization, colorspace conversion, and conversion from interlace to progressive scan displays ("proscan"). The proscan process converts interlaced fields having n odd rows or n even rows of data into display frames having 2n rows. The order in which these tasks are performed may vary. As explained below in connection with FIGS. 3 and 4, secondary image data converter 13 may provide data that is already proscanned. In this case, the secondary image would be inserted after the main image has been "proscanned."

Display memory 16 receives processed pixel data from processor system 15. Either processor 15 or display memory 16 formats the data into "bit-plane" format. The bit-plane format permits each pixel element of SLM 17 to be turned on or off in response to the value of 1 bit of data at a time. In a typical display system 10, display memory 16 is a "double buffer" memory, which means that it has a capacity for at least two display frames. The buffer for one display frame can be read out to SLM 17 while the buffer another display frame is being written. The two buffers are controlled in a "ping-pong" manner so that data is continuously available to SLM 17.

SLM 17 may be any type of SLM. As stated above, although this description is in terms of a DMD-type of SLM 17, other types of pixel array display devices could be substituted into display system 10 and used for the invention described herein. Details of a suitable SLM 17 are set out in U.S. Pat. No. 4,956,619, entitled "Spatial Light Modulator," which is assigned to Texas Instruments Incorporated, and incorporated by reference herein. In the example of this description, SLM 17 has a 640×480 array of mirror elements, each of which is individually addressable. When addressed, the direction in which each mirror tilts, on or off, results in a reflected image.

Display optics unit 18 has optical components for receiving the image from SLM 17 and for illuminating an image plane such as a display screen. For color displays, the bit-planes for each color could be sequenced and synchronized to a color wheel that is part of display optics unit 18. Or, the data for different colors could be concurrently displayed on multiple SLMs and combined by display optics unit 18. Master timing unit 19 provides various system control functions.

More comprehensive descriptions of a DMD-based digital display system are set out in U.S. Pat. No. 5,079,544, entitled "Standard Independent Digitized Video System," and in U.S. Pat. Ser. No. 08/147,249, U.S. Pat. No. 5,526,051, entitled "Digital Television System," and in U.S. Pat. Ser. No. 08/146,385, U.S. Pat. No. 5,452,024, entitled "DMD Display System." U.S. Pat. No. 5,278,652, entitled "DMD Architecture and Timing for Use in a Pulse-Width Modulated Display System," describes a method of formatting video data for use with a DMD-based display system and a method of modulating bit-planes of data to provide varying pixel brightness. The general use of a DMD-based display system with a color wheel to provide sequential color images is described in U.S. Pat. No. 5,233,385, entitled "White Light Enhanced Color Field Sequential Projection." These patents and patent applications are assigned to Texas Instruments Incorporated, and are incorporated herein by reference.

Sampling for Staggered Pixel Array

FIG. 2 is a block diagram of a secondary image data converter 13' for providing pixel data to an SLM 17 having a staggered pixel array. As indicated, this means that the pixels of SLM 17 are offset by ½ pixel width from one line to another.

Data converter 13' receives an analog Y/C signal representing the secondary image from signal interface 11. Y/C separator 21 separates the Y component of the signal from the C components, such as U and V. If, in the signal path for the main image, as illustrated in FIG. 1, Y/C separator 12a operates on the analog signal rather than on digital data after sampling, the functions of Y/C separator 12a and Y/C separator 21 could be combined in a single unit that operates on both the main image signal and the secondary image signal.

Analog filter 22 receives the Y, U, and V signals. Filter 22 implements such functions as anti-aliasing function and peaking. An example of a suitable filter is described in U.S. Pat. Ser. No. 08/221,725, U.S. Pat. No. 5,459,528, referenced in the Background and incorporated by reference herein. For anti-aliasing, filter 22 filters out high frequency components of the signals. For peaking, the higher frequencies of the non-filtered part of the signals are amplified. The optimum amount and range of peaking are somewhat subjective, and may be experimentally derived.

The filtered signals are received by A/D converter 23. A/D converter 23 has at least one sample rate, such as for 1:9 scaling or for 1:16 scaling. A/D converter 23 could have other sample rates and could be selectable between two or more sample rates, depending on which horizontal scaling factor(s) are desired to be supported. The desired sample rate can be varied by selecting a clock input. The sample rate, assuming one sample per pixel, can be determined from the scaling ratio, the number of pixels per line in the main image, and the line rate. For example, for a display having a main image of 640 pixels per line, a 1:9 scaling ratio has a horizontal scaling factor of ⅓, for 213 (640/3) samples per line, plus any horizontal blanking time. This value is multiplied by the line rate (lines per second), to obtain the sample rate (samples per second). A feature of secondary image data converter 13' is that for staggered pixels, this rate is doubled. For 1:9 or 1:16 scaling, A/D converter 23 runs at ⅔ or ½, respectively, of the sample rate of the main image.

The effect of low pass filter 22 and A/D converter 23 is that of a "horizontal decimation filter." The Y, U, and V signals are now represented by twice the number of samples needed per line. Also, at this point, the data represents an unscaled number of lines per field. Each even or odd field of data has the same number of lines as the main image, as determined by the horizontal sync signals.

Multiplexer 24 receives three bit streams, one of Y data, one of U data, and one of V data. For even output rows of SLM 17, multiplexer 24 selects data from these bit streams in an "even-row" pattern. For odd output rows of SLM 17, multiplexer 24 selects data in an "odd-row" pattern. These patterns each have a Y value every other sample, separated by either a U value or a V value. As between the two patterns, the Y values are offset by one sample. This accommodates the offset of the staggered pixels from line to line.

FIG. 2A illustrates an example of the output of multiplexer 24, as compared to the pixel data for the main image, for 1:9 secondary images. There is one Y value of the secondary image for every three values of the main image. Thus, the Y values are "fully sampled" in the sense that there is a Y value for every pixel of the secondary image. The C values, U and V, are "half sampled." The Y values of even lines are offset from Y value of odd lines, so that the Y values correspond with the pixel positions in the staggered pixel array. As explained below, multiplexer 24 switches between these patterns depending on whether the current line will become an even line or an odd line of SLM 17. The designation of one pattern as "even" and one as "odd" is arbitrary; the patterns could be switched for even and odd.

FIG. 2B illustrates an example of the output of multiplexer 24, as compared to the pixel data for the main image, for 1:16 secondary images. There is one Y value for every four values of the main image. Like the 1:9 pixel data, the Y values are fully sampled and the C values are half sampled.

Secondary image data converter 13' may be configured to output data in interlaced or progressive scan format. The former configuration is used when SLM 17 is an interlaced display device or when SLM 17 is a progressive scan device and main image processor 15 performs the interlaced to progressive scan conversion on both the main image and the secondary image. The latter configuration is used when SLM 17 is a progressive scan device and secondary image data converter 13' performs the interlaced to progressive scan conversion on the secondary image.

For a 1:9 output image when secondary image data converter 13' is configured for interlaced output, multiplexer 24 selects one output line for every three input lines. FIG. 2C illustrates a possible line selection scheme for a 1:9 image for an even input field. All of the output lines produced from an even input field will become even lines on SLM 17, with main image processor producing the odd lines on SLM 17. Conversely, all of the output lines produced from an odd input field will become odd lines on SLM 17, with the main image processor 15 producing even lines on SLM 17. Therefore, the even and odd sampling patterns in FIG. 2A swap field-to-field as opposed to line-to-line. For a 1:16 output image, multiplexer 24 selects one output line for every four input lines.

For a 1:9 output image when secondary image data converter 13' is configured for progressive scan output, multiplexer 24 selects two output lines for every three input lines. FIG. 2D illustrates a possible line selection scheme for a 1:9 image for an even input field. For this case, secondary image data converter 13' produces alternating even and odd lines on SLM 17, so the even and odd sampling patterns of FIG. 2A swap line-to-line. For a 1:16 output image, multiplexer 24 selects one output line for every two input lines.

In general, multiplexer 24 selects the desired number of output lines. For each output line, multiplexer 24 selects the proper pattern depending on whether that line is to become an even output line or an odd output line. Once the samples are selected, the Y, U, and V samples are combined to generate pixel data for each pixel to be displayed. In FIG. 1, this combination of Y,U, and V values is performed by data converter 13, but could be performed by additional logic circuitry (not shown) in secondary image data generator 13'.

In an alternate embodiment of secondary image data converter 13', the multiplexing could be performed on the analog YUV components before sampling. The A/D conversion would provide the same even-line and odd-line patterns described above.

Sampling for Progressive Scan Display

FIG. 3 is a block diagram of secondary image data converter 13" for providing progressive scan ("proscan") data to SLM 17. For this embodiment, it is assumed that the input video signal is an interlaced signal. For proscan data, each input field of interlaced data becomes a complete frame of SLM data. SLM 17 may have either a staggered or non-staggered pixel array; however, a special embodiment of secondary image data converter 13 for progressive scan displays on a staggered pixel array device is described in connection with FIG. 4.

Y/C separator 21 and analog filter 22 perform the same functions as for the data converter 13' of FIG. 2. A/D converter 33 receives a Y signal, a U signal, and a V signal from analog filter 22. The sample rate, assuming one sample per pixel, is determined by the scaling ratio, the number of pixels per line in the main image, and the line rate. For example, for a display having a main image of 640 pixels per line, a 1:9 scaling ratio has a horizontal scaling factor of ⅓, for 213 (640/3) samples per line. This value, plus an appropriate number of samples for horizontal blanking time, is multiplied by the line rate (lines per second), to obtain the sample rate (samples per second). For 1:9 or 1:16 secondary images, A/D converter 33 runs at ⅓ or ¼, respectively, of the sample rate for the main image.

The result of the sampling step is streams of Y and C data samples. These samples are ordered field-by-field of lines of samples. From each field of input data, line selector 34 selects the appropriate number of lines for a progressively scanned frame. In general, the number of lines selected is 2/n(v), where 1/n(v) is the vertical scaling factor. For example, for a 1:9 image, the vertical scaling factor is ⅓ and line selector 34 selects two output lines from every three input lines. This can be accomplished by de-selecting every third line. For a 1:16 image, the vertical scaling factor is ¼ and line selector 34 selects one output line from every two input lines. In either case, because the input field was of lines of interlaced data, the output frame has the correct number of lines for a progressive scan display.

In a more complicated embodiment, line selector 34 includes an interpolation processor, which interpolates every three lines to generate two lines. For example, for a 1:9 image, pixel values from lines 1 and 2 of the input field might be interpolated to form line 1 of an output frame. Then, pixel value from lines 2 and 3 of the input field could be interpolated to form line 2 of the output frame. This process would continue for each line of the input field so that the output frame had ⅔ as many lines as the input field. For a 1:16 image, line selector 24 would interpolate every two adjacent input lines to create one output line.

After the lines are selected, the Y, U, and V samples are combined to form a pixel value for each pixel to be displayed. In the example of this description, data is available for fully sampled Y, U, and V values, but in alternative embodiments, A/D converter 33 could be modified to provide less than fully sampled chrominance data. The data is combined either by data converter 13 or by additional logic (not shown) in secondary image data generator 13" and is then ready for insertion into same data path as the main image pixel data.

Sampling for Interpolated Pixel Data for Staggered Pixel Array

FIG. 4 is a block diagram of secondary image data converter 13'" for interpolated pixel data for an SLM 17 having a staggered pixel array. Data converter 13'" is used as an alternative to data converter 13', when it is desired to interpolate the samples rather than to simply select some lines and de-select others.

Y/C separator 21 and analog filter 22 perform the same functions as for the data converters 13' and 13" of FIGS. 2 and 3. Two A/D converters 43a and 43b each provide three streams of Y, U, and V data. A first A/D converter 43a provides data for even output lines in one of the patterns described above in connection with FIGS. 2A and 2B. A second A/D converter 43b provides data for odd output lines in the other of the patterns described above.

Multiplexer 44 selects data for interpolation for output lines. In general, for even output lines, multiplexer 44 selects data from one of the patterns. For odd output lines, it selects data from the other of the patterns. Interpolator 45 interpolates the selected data to generate each output line. The number of output lines per frame depends on whether or not the data is proscan data. As explained above, for non-proscan data, 1/n(v) output lines are provided, whereas for proscan data, 2/n(v) output lines are provided.

FIG. 4A illustrates a possible interpolation scheme for a 1:9 proscan image. Input lines 0 and 1 are interpolated to create output line 0. For this interpolation step, the output of A/D converter 43a is selected in the even-line pattern described above in connection with FIG. 2A. Input lines 1 and 2 are interpolated to create output line 1. For this interpolation step, the output of A/D converter 43b is selected in the odd-line pattern described above in connection with FIG. 2A.

An alternate embodiment would combine A/D converters 43a and 43b into one A/D converter 43, operating at twice the sample clock rate. This single, faster A/D converter 43 would provide both even and odd sampling patterns directly to interpolator 45, eliminating the need for multiplexer 44.

The need for two A/D converters 43a and 43b also depends on the scaling factor and the interpolation scheme. For some interpolation schemes, such as for a 1:16 proscan image where every two adjacent input lines are interpolated to become an output line, it is not necessary to use the same input line to generate two output lines. In this case, only one A/D converter 43 is required, eliminating the need for multiplexer 44.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of providing pixel data from a luminance component and at least one chrominance component of an analog video signal, for a secondary image within or adjacent to a main image having a main image sample rate, said secondary image being displayed by a display device having a staggered pixel array, comprising the steps of:

sampling each of said components of said analog video signal at a rate of 2/n(h) times said main image sample rate, where 1/n(h) is the horizontal scaling factor of said secondary image and n is one-half the number of rows in said main image, thereby providing a stream of luminance samples and at least one stream of chrominance samples;

selecting, from said streams of samples, a first pattern of samples for even rows of said staggered pixel array, wherein every other sample is a luminance sample and every other sample is a chrominance sample; and selecting, from said streams of samples, a second pattern of samples for odd rows of said staggered pixel array, wherein every other sample is a luminance sample and every other sample is a chrominance sample, and wherein said luminance samples of said first pattern and of said second pattern are offset by one sample.

2. The method of claim 1, wherein said analog video signal has the luminance component and two chrominance components such that there are two said streams of chrominance components, and wherein said first pattern and said second pattern have samples from both said chrominance components.

3. The method of claim 1, wherein said selecting steps are repeated for 1/n(v) times the number of lines per field of said analog video signal, where 1/n(v) is a vertical scaling factor.

4. The method of claim 3, wherein said selecting steps are performed by selecting every nth line.

5. The method of claim 1, wherein said selecting steps are repeated for 2/n(v) times the number of lines per field of said analog video signal, where 1/n(v) is a vertical scaling factor.

6. The method of claim 5, wherein said selecting steps are performed by selecting two lines of every n lines.

7. A secondary image data converter for providing pixel data from a luminance component and at least one chrominance component of an analog video signal, for a secondary image within or adjacent to a main image having a main image sample rate, said secondary image being displayed by a display device having a staggered pixel array, comprising:

an A/D converter for sampling each of said components of said analog video signal at a rate of 2/n(h) times said main image sample rate, where 1/n(h) is the horizontal scaling factor of said secondary image and n is one-half the number of rows in said main image, thereby providing a stream of luminance samples and at least one stream of chrominance samples; and a multiplexer for selecting, from said streams of samples, a first pattern of samples for even rows of said staggered pixel array, wherein every other sample is a luminance sample and every other sample is a chrominance sample, and for selecting, from said streams of samples, a second pattern of samples for odd rows of said staggered pixel array, wherein every other sample is a luminance sample and every other sample is a chrominance sample, and wherein said luminance samples of said first pattern and of said second pattern are offset by one sample.

8. A method of providing progressive scan pixel data from an interlaced analog video signal, for a secondary image within or adjacent to a main image having a main image sample rate, comprising the steps of:

sampling said analog video signal at a rate of 1/n(h) times said main image sample rate, where 1/n(h) is the horizontal scaling factor of said secondary image and n is one-half the number of rows in said main image; thereby providing field data on a line-by-line basis; and selecting 2n(v) the number of lines of each field of said field data, where 1/n(v) is the vertical scaling factor of said secondary image.

9. The method of claim 8, wherein said secondary image is a 1:9 image and said selecting step comprises de-selecting every third line.

10. The method of claim 8, wherein said secondary image is a 1:16 image and said selecting step comprises de-selecting every other line.

11. The method of claim 8, wherein said selecting step comprises interpolating said lines of each field of said field data to generate 2/n(v) the number of lines of each field.

12. A secondary image data generator for providing progressive scan pixel data from an interlaced analog video signal, for a secondary image within or adjacent to a main image having a main image sample rate, comprising:

an A/D converter for sampling said analog video signal at a rate of 1/n(h) times said main image sample rate, where 1/n(h) is the horizontal scaling factor of said secondary image and n is one-half the number of rows in said main image; thereby providing field data on a line-by-line basis; and a line selector for selecting 2/n(v) the number of lines of each field of said field data, where 1/n(v) is the vertical scaling factor of said secondary image.

13. The secondary image data generator of claim 12, wherein said line selector interpolates samples of lines of said field data.

14. A method of providing interpolated pixel data from a luminance component and at least one chrominance component of an analog video signal, for a secondary image within or adjacent to a main image having a main image sample rate, said secondary image being displayed on a display device having a staggered pixel array, comprising the steps of:

sampling each of said components of said analog video signal at a rate of 2/n(h) times said main image sample rate, where 1/n(h) is the horizontal scaling factor of said secondary image and n is one-half the number of rows in said main image; thereby providing a stream of luminance samples and at least one stream of chrominance samples having a first pattern for even rows of said staggered pixel array, wherein every other sample is a luminance sample and every other sample is a chrominance sample;

sampling each of said components of said analog video signal at said rate of 2/n(h) times said main image sample rate, thereby providing a stream of luminance samples and at least one stream of chrominance samples having a second pattern for odd rows of said staggered pixel array, wherein every other sample is a luminance sample and every other sample is a chrominance sample, and wherein said luminance samples of said first pattern and of said second pattern are offset by one sample;

selecting between samples of said first pattern and samples of said second pattern on a line-by-line basis to provide lines of interpolation samples, such that even output lines are interpolated from samples of said first pattern and odd output lines are interpolated from samples of said second pattern; and interpolating said interpolation samples to provide output lines for said secondary image.

15. The method of claim 14, wherein said selecting step selects two lines at a time and said interpolation step operates on these two lines.

16. The method of claim 14, wherein said interpolating step provides a number of output lines that is 1/n(v) times the number of lines per input field, where 1/n(v) is the vertical scaling factor of said secondary image.

17. The method of claim 14, wherein said interpolating step provides a number of output lines that is 2/n(v) times the number of lines per input field, where 1/n(v) is the vertical scaling factor of said secondary image.

18. A secondary image data generator for providing progressive scan pixel data from a luminance component and at least one chrominance component of an analog video signal, for a secondary image within or adjacent to a main image having a main image sample rate, said secondary image being displayed on a display device having a staggered pixel array, comprising:

a first A/D converter for sampling each component of said analog video signal at a rate of 2/n(h) times said main image sample rate, where 1/n(h) is the horizontal scaling factor of said secondary image and n is one-half the number of rows in said main image; thereby providing a stream of luminance samples and at least one stream of chrominance samples having a first pattern for even rows of said staggered pixel array, wherein every other sample is a luminance sample and every other sample is a chrominance sample;

a second A/D converter for sampling each of said components of said analog video signal at said rate of 2/n(h) times said main image sample rate, thereby providing a stream of luminance samples and at least one stream of chrominance samples having a second pattern for odd rows of said staggered pixel array, wherein every other sample is a luminance sample and every other sample is a chrominance sample, and wherein said luminance samples of said first pattern and of said second pattern are offset by one sample;

a multiplexer for selecting between samples of said first pattern and samples of said second pattern on a line-by-line basis to provide lines of interpolation samples, such that even output lines are interpolated from samples of said first pattern and odd output lines are interpolated from samples of said second pattern; and an interpolation processor for interpolating said interpolation samples to provide output lines for said secondary image.

19. A method of providing interpolated pixel data from a luminance component and at least one chrominance component of an analog video signal, for a secondary image within or adjacent to a main image having a main image sample rate, said secondary image being displayed on a display device having a staggered pixel array, comprising the steps of:

sampling each of said components of said analog video signal at a rate of 2/n(h) times said main image sample rate, where 1/n(h) is the horizontal scaling factor of said secondary image and n is one-half the number of rows in said main image; thereby providing a stream of luminance samples and at least one stream of chrominance samples, wherein every other sample is a luminance sample and every other sample is a chrominance sample;

selecting alternating pairs of said samples, thereby providing samples for odd output lines and samples for even output lines; and interpolating said samples for the even output lines and said samples for the odd output lines, to provide output lines for said secondary image.

* * * * *